United States Patent
Geerits et al.

(10) Patent No.: US 8,944,183 B2
(45) Date of Patent: Feb. 3, 2015

(54) LOW FREQUENCY FORMATION SHEAR SLOWNESS FROM DRILLING NOISE DERIVED QUADRUPOLE ARRAY DATA

(75) Inventors: Theodorus W. Geerits, Nienhagen (DE); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 699 days.

(21) Appl. No.: 13/198,265

(22) Filed: Aug. 4, 2011

(65) Prior Publication Data
US 2012/0037423 A1 Feb. 16, 2012

Related U.S. Application Data

(60) Provisional application No. 61/372,626, filed on Aug. 11, 2010.

(51) Int. Cl.
| | | |
|---|---|---|
| *E21B 47/00* | (2012.01) | |
| *G01V 1/48* | (2006.01) | |
| *G01V 1/28* | (2006.01) | |

(52) U.S. Cl.
CPC . *E21B 47/00* (2013.01); *G01V 1/48* (2013.01); *G01V 1/284* (2013.01)
USPC .................. 175/40; 175/50; 181/102; 367/31

(58) Field of Classification Search
USPC ........................... 175/40, 50; 181/102; 367/31
See application file for complete search history.

(56) References Cited

U.S. PATENT DOCUMENTS

| | | | |
|---|---|---|---|
| 5,441,890 A | | 8/1995 | Menzinger et al. |
| 5,467,320 A | * | 11/1995 | Maki, Jr. .......................... 367/40 |
| 5,753,812 A | | 5/1998 | Aron et al. |
| 6,393,365 B1 | | 5/2002 | Runnestrand et al. |
| 6,850,168 B2 | | 2/2005 | Tang et al. |
| 7,039,524 B2 | | 5/2006 | Haugland |
| 7,207,397 B2 | | 4/2007 | Miyamoto et al. |
| 2002/0113717 A1 | | 8/2002 | Tang et al. |
| 2009/0205899 A1 | | 8/2009 | Geerits et al. |

OTHER PUBLICATIONS

Kurkjian, A.L., et al., "Acoustic multipole sources in fluid-filled boreholes," Gedophysics, vol. 51, pp. 148-163 (Jan. 1986).

(Continued)

*Primary Examiner* — Giovanna Wright
(74) *Attorney, Agent, or Firm* — Mossman Kumar & Tyler PC

(57) ABSTRACT

The present disclosure is related to apparatuses and methods measuring and processing a characteristic of subsurface earth formations penetrated by a borehole. More specifically this present disclosure relates to a method and apparatus for measuring and processing an acoustic characteristic such as formation shear wave velocity of subsurface sonic waves after these waves traverse earth formations adjoining a borehole or passing through a portion of the subsurface. The apparatus may include: a bottomhole assembly, a drill bit configured to generate an acoustic signal, at least two acoustic detectors, and a processor. The acoustic signal may include a specific multipole signal that may propagate through an earth formation along the borehole. The method may include use of the apparatus, including steps for estimating a shear velocity of the acoustic signal using signals from the at least two acoustic detectors.

18 Claims, 15 Drawing Sheets

(56) References Cited

OTHER PUBLICATIONS

Schmitt, D.P., "Dipole logging in cased boreholes," Jnl. Acoust. Soc. Am., vol. 2, pp. 640-657 (Feb. 1993).

Tang, X.M., et al., "Multipole Acoustic Logging-While-Drilling," SEG Int'l Expo & 72nd Annual Mtg (Oct. 2002).

Geerits, T.W., et al., "Multipole Borehole Acoustic Theory: Source Imbalances and the Effects of an Elastic Logging Tool," Jnl of Appl Geophysics, vol. 70, Issue 2, pp. 113-143 (Feb. 2010).

* cited by examiner

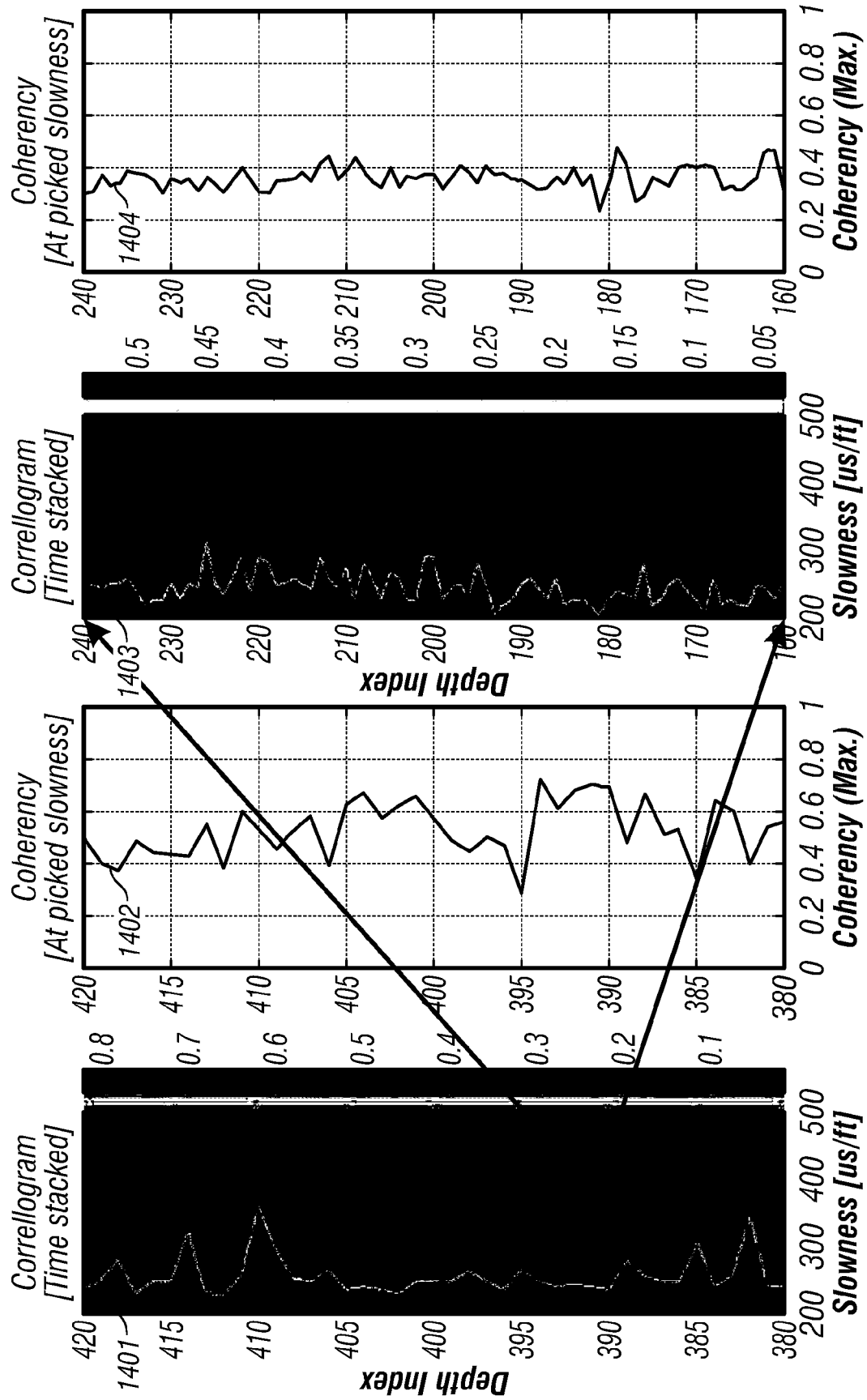

LOW FREQUENCY FORMATION SHEAR SLOWNESS FROM DRILLING NOISE DERIVED QUADRUPOLE ARRAY DATA

CROSS-REFERENCES TO RELATED APPLICATIONS

This application claims priority from U.S. Provisional Patent Application Ser. No. 61/372,626, filed on 11 Aug. 2010.

FIELD OF THE DISCLOSURE

This present disclosure generally relates to a method and apparatus for measuring and processing a characteristic of subsurface earth formations penetrated by a borehole. More specifically this present disclosure relates to a method and apparatus for measuring and processing an acoustic characteristic such as formation shear wave velocity of subsurface sonic waves after these waves traverse earth formations adjoining a borehole or passing through a portion of the subsurface.

BACKGROUND OF THE DISCLOSURE

To obtain hydrocarbons such as oil and gas, wellbores (also referred to as the boreholes) are drilled by rotating a drill bit attached at the end of a drilling assembly generally referred to as the "bottom hole assembly" (BHA) or the "drilling assembly." The wellbore path of such wells is carefully planned prior to drilling such wellbores utilizing seismic maps of the earth's subsurface and well data from previously drilled wellbores in the associated oil fields. Due to the very high cost of drilling such wellbores and the need to minimize time actually spent drilling and wireline logging wells, it is essential to gain as much information as possible during drilling of the wellbores. Information about downhole conditions and materials may be acquired with wireline tools or BHAs. Wireline tools are generally used after a wellbore is drilled, bottom hole assemblies may be used while the well is being drilled as part of the drilling string. Downhole wellbore information acquired from BHA components may be utilized, among other things, to monitor and adjust the drilling direction of the wellbores or to detect the presence of geologic formations and hydrocarbons.

In logging-while-drilling (LWD) through an earth formation, it is desirable to measure formation shear wave velocity. The shear wave velocity of earth formations provides information important for exploration and production of oil and gas from the formation. The shear wave velocity profile enables the conversion of seismic shear wave time sections to depth sections and is utilized in the interpretation of seismic wave amplitude variation versus detector offset. The ratio between the shear wave velocity and the compressional wave velocity is closely related to the rock lithology and is related to hydrocarbon saturation. Shear wave velocity is also used to evaluate the mechanical properties of the formation in reservoir engineering applications.

Because of the importance of earth formation shear velocity, various methods have been developed to measure it. In conventional wireline logging using a monopole acoustic tool, the shear velocity can be measured from the shear wave refracted along the borehole wall if the formation shear wave velocity is greater than the borehole fluid acoustic velocity. A formation that has a shear wave velocity faster than the borehole fluid is called a "fast formation." However, in a formation where the shear velocity is slower than borehole fluid velocity, a "slow formation," the shear wave can no longer refract along the borehole wall, and the shear velocity cannot be directly measured from monopole logging. Because of the need to measure shear velocity in slow formations, especially in the soft sediments of deep-water reservoirs, dipole acoustic logging tools were developed. The dipole tool may be used to induce and measure the bending or flexural wave motion in the formation. In a sufficiently low frequency range (1-3 kHz), the flexural wave travels at the shear velocity of the formation, regardless whether the formation is fast or slow. This allows for direct measurement of formation shear velocity using the dipole acoustic tool. Dipole acoustic logging is now a mature technology with worldwide commercial applications.

A viable technique for shear wave velocity measurement is using the quadrupole shear waves. A quadrupole acoustic tool induces and measures the quadrupole shear wave in the formation. The low-frequency portion of the wave travels at the formation shear wave velocity, allowing for direct shear velocity measurement from the quadrupole wave. LWD acoustic technology has been developed in recent years out of the needs for saving rig-time and for real-time applications such as geosteering and pore pressure determination, among others. The LWD acoustic technology is aimed at measuring the compressional wave and shear wave velocities of an earth formation during drilling. This technology has been successful in the measurement of compressional wave velocity of earth formations. The need for determining the shear wave velocity in slow formations calls for further development of the technology for shear wave measurement capability.

As discussed later in the present disclosure, the application of the dipole acoustic technology to LWD has a serious drawback caused by the presence of the drilling drill collar with BHA that occupies a large part of the borehole. The drawback is that the formation dipole shear wave traveling along the borehole is severely contaminated by the dipole wave traveling in the drill collar. There is a need for a method of determination of shear wave velocities of earth formations that is relatively robust in the presence of tool mode waves propagating along the drill collar. The need is particularly acute in situations where the formation shear velocity is less than the velocity of propagation of compressional waves in borehole fluids. The present disclosure satisfies this need and, additionally, also provides a method for determining shear wave slowness using the drill bit as an acoustic source.

SUMMARY OF THE DISCLOSURE

In aspects, the present disclosure generally relates to determining formation shear properties in a LWD environment. More specifically, the present disclosure is related to the use of signals indicative of a multipole component of a propagating acoustic signal and processing data acquired with acoustic detectors to estimate parameters of the borehole and/or the earth formation.

One embodiment according to the present disclosure includes an apparatus configured to evaluate an earth formation, the apparatus comprising: a bottomhole assembly (BHA) configured to be conveyed in a borehole; a drillbit on the BHA configured to generate an acoustic signal including multipole components propagating through the earth formation during continued rotation of the BHA; a first acoustic detector on the BHA configured to produce a first signal indicative of the multipole components contained in the propagating acoustic signal; a second acoustic detector on the BHA axially spaced apart from the first acoustic detector and configured to produce a second signal indicative of the multipole components contained in the propagating acoustic signal; and at least one processor configured to estimate a formation velocity of the earth formation using the first signal and the second signal.

Another embodiment according to the present disclosure includes a method for evaluating an earth formation, comprising: conveying a drillbit into a borehole on a bottomhole assembly (BHA) and using the drillbit for producing a propagating acoustic signal including multipole components in the earth formation; using a first acoustic detector on the BHA for producing a first signal indicative of the multipole components in the propagating acoustic signal; using a second acoustic detector axially spaced apart from the first acoustic detector for producing a second signal indicative of the multipole components; and estimating a formation velocity of an acoustic signal based on the first signal and the second signal.

Another embodiment according to the present disclosure includes a non-transitory computer-readable medium product having stored thereon instructions that, when executed by at least one processor, perform a method, the method comprising: estimating a velocity of an earth formation from a first signal produced by a first detector on a bottomhole assembly (BHA) responsive to a multipole signal generated by a drillbit on the BHA and a second signal produced by a second detector on the BHA spaced apart axially from the first detector responsive to the generated multipole signal.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein:

FIG. 14A shows a time-stacked correlogram of quadrupole data with a drillbit as the source;

FIG. 14B shows the coherence at the picked slowness of the data in FIG. 14A;

FIG. 14C shows a time-stacked correlogram of quadrupole data with a 2 kHz quadrupole source; and FIG. 14D shows the coherence at the picked slowness of the data in FIG. 14C.

DETAILED DESCRIPTION

Figure 1A:
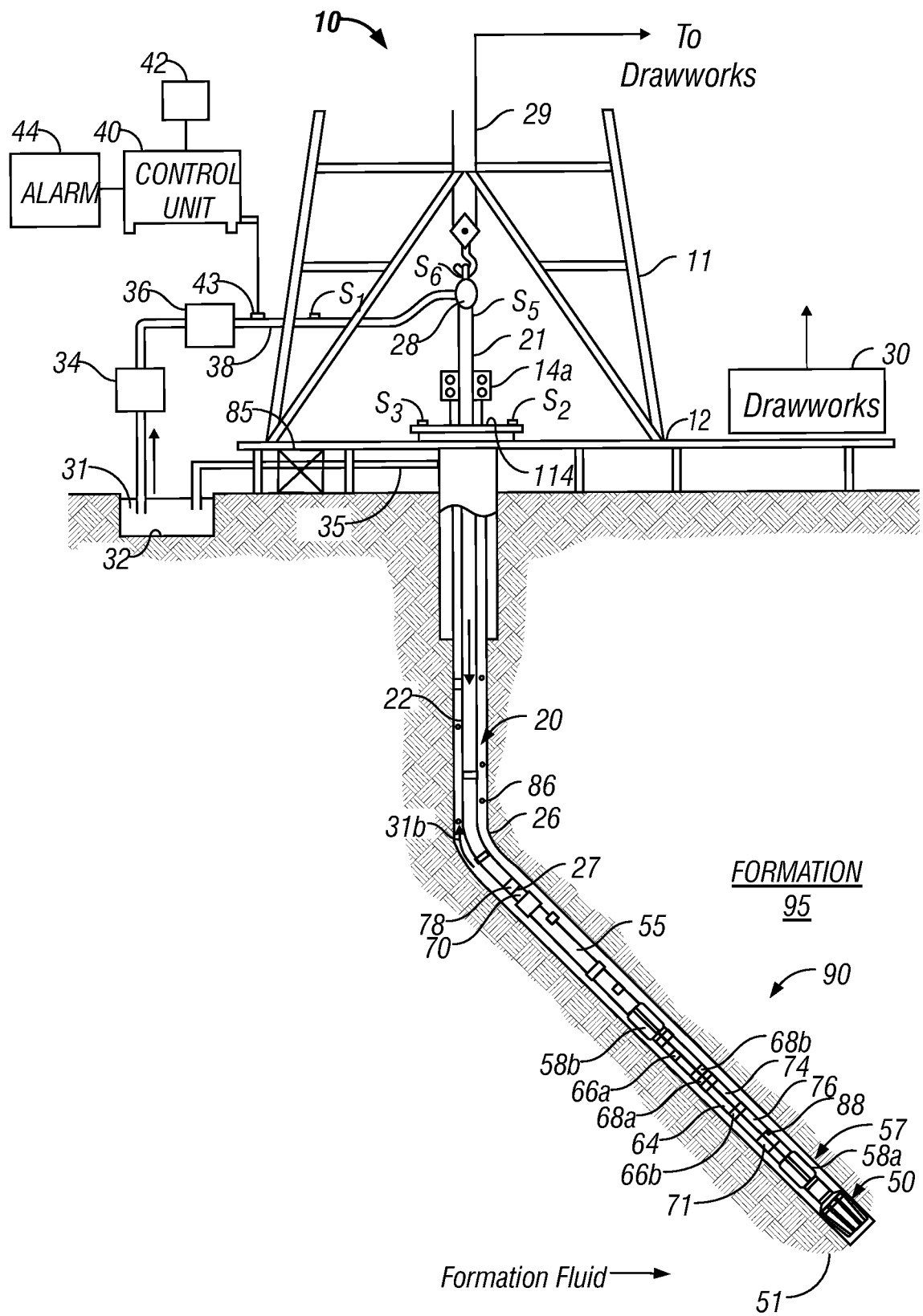
FIG. 1A shows a schematic diagram of a drilling system that employs the apparatus of one embodiment of the present disclosure.

The present disclosure generally relates to determining formation shear properties in a LWD environment. More specifically, the present disclosure is related to the use of signals indicative of a multipole component of a propagating acoustic signal and processing data acquired with acoustic detectors to estimate parameters of the borehole and/or the earth formation. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

FIG. 1A shows a schematic diagram of exemplary drilling system 10 having a bottom hole assembly (BHA) or drilling assembly 90 that includes sensors for downhole wellbore condition and location measurements. The BHA 90 is conveyed in a borehole 26. The drilling system 10 may include a conventional derrick 11 erected on a floor 12 which supports a rotary table 14 that is rotated by a prime mover such as an electric motor (not shown) at a desired rotational speed. The drill string 20 includes a tubing (drill pipe or coiled-tubing) 22 extending downward from the surface into the borehole 26. A drill bit 50, attached to the drill string 20 end, disintegrates the geological formations 95 when it is rotated to drill the borehole 26. The drill string 20 may be coupled to a drawworks 30 via a kelly joint 21, swivel 28 and line 29 through a pulley (not shown). Drawworks 30 is operated to control the weight on bit ("WOB"), which is an important parameter that affects the rate of penetration ("ROP"). A tubing injector 14a and a reel (not shown) are used instead of the rotary table 14 to inject the BHA into the wellbore 26 when a coiled-tubing is used as the conveying member 22. The operations of the drawworks 30 and the tubing injector 14a are known in the art and are thus not described in detail herein.

During drilling, a suitable drilling fluid 31 from a mud pit (source) 32 is circulated under pressure through the drill string 20 by a mud pump 34. The drilling fluid may pass from the mud pump 34 into the drill string 20 via a desurger 36 and the fluid line 38. The drilling fluid 31 discharges at the borehole bottom 51 through openings in the drill bit 50. The drilling fluid 31 circulates uphole through the annular space 27 between the drill string 20 and the borehole 26 and returns to the mud pit 32 via a return line 35 and drill-cutting screen 85 that removes the drill cuttings 86 from the returning drilling fluid 31b. A sensor $S_1$ in line 38 provides information about the fluid flow rate. A surface torque sensor $S_2$ and a sensor $S_3$ associated with the drill string 20 respectively provide information about the torque and the rotational speed of the drill string 20. Tubing injection speed is determined from the sensor $S_5$, while the sensor $S_6$ provides the hook load of the drill string 20.

In some applications only rotating the drill pipe 22 rotates the drill bit 50. However, in many other applications, a downhole motor 55 (mud motor) is disposed in the drilling assembly 90 to rotate the drill bit 50 and the drill pipe 22 is rotated usually to supplement the rotational power, if required, and to effect changes in the drilling direction. In either case, the ROP for a given BHA largely depends on the WOB or the thrust force on the drill bit 50 and its rotational speed.

The mud motor 55 is coupled to the drill bit 50 via a drive disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the mud motor 55 and the reactive upward loading from the applied WOB. A lower stabilizer 58a coupled to the bearing assembly 57 acts as a centralizer for the lowermost portion of the drill string 20.

A surface control unit or processor 40 receives signals from the downhole sensors and devices via a sensor 43 placed in the fluid line 38 and signals from sensors $S_1$, $S_6$, and other sensors used in the system 10 and processes such signals according to programmed instructions provided to the surface control unit 40. The surface control unit 40 displays desired drilling parameters and other information on a display/monitor 42 that is utilized by an operator to control the drilling operations. The surface control unit 40 may include a computer, memory for storing data, recorder for recording data and other peripherals. The surface control unit 40 may also includes a simulation model and processes data according to programmed instructions. The control unit 40 may be adapted to activate alarms 44 when certain unsafe or undesirable operating conditions occur.

The BHA 90 may also include formation evaluation sensors or devices for determining resistivity, density and porosity of the formations surrounding the BHA. A gamma ray device for measuring the gamma ray intensity and other nuclear and non-nuclear devices used as measurement-while-drilling devices are suitably included in the BHA 90. As an example, FIG. 1A shows an example resistivity-measuring device 64 in BHA 90. It provides signals from which resistivity of the formation near or in front of the drill bit 50 may be determined. The resistivity device 64 has transmitting antennae 66a and 66b spaced from the receiving antennae 68a and 68b. In operation, the transmitted electromagnetic waves are perturbed as they propagate through the formation surrounding the resistivity device 64. The receiving antennae 68a and 68b detect the perturbed waves. Formation resistivity may be derived from the phase and amplitude of the detected signals. The detected signals may be processed by a downhole computer 70 to determine the resistivity and dielectric values.

An inclinometer 74 and a gamma ray device 76 may be suitably placed along the resistivity-measuring device 64 for respectively determining the inclination of the portion of the drill string near the drill bit 50 and the formation gamma ray intensity. Any suitable inclinometer and gamma ray device, however, may be utilized for the purposes of this present disclosure. In addition, position sensors (not shown), such as accelerometers, magnetometers or gyroscopic devices may be disposed in the BHA 90 to determine the drill string azimuth, true coordinates and direction in the wellbore 26. Such devices are known in the art and are not described in detail herein.

In the above-described configuration, the mud motor 55 transfers power to the drill bit 50 via one or more hollow shafts 58b that run through the resistivity-measuring device 64. The hollow shaft 58b enables the drilling fluid to pass from the mud motor 55 to the drill bit 50. In an alternate embodiment of the drill string 20, the mud motor 55 may be coupled below resistivity measuring device 64 or at any other suitable place. The above described resistivity device, gamma ray device and the inclinometer are preferably placed in a common housing that may be coupled to the motor. The devices for measuring formation porosity, permeability and density (collectively designated by numeral 78) are preferably placed above the mud motor 55. The BHA 90 may also include one or more seismic receivers (collectively represented herein by numeral 88) at a suitable location in the BHA 90. Such devices 78 and 88 are known in the art and are thus not described in any detail.

As noted earlier, a significant portion of the current drilling systems, especially for drilling highly deviated and horizontal wellbores, utilize coiled-tubing for conveying the drilling assembly downhole. In such application, a thruster 71 may be deployed in the BHA 90 to provide the required force on the drill bit 50. For the purpose of this present disclosure, the term weight on bit ("WOB") is used to denote the force on the bit applied to the drill bit during the drilling operation, whether applied by adjusting the weight of the drill string or by thrusters. Also, when coiled-tubing is utilized a rotary table 14 does not rotate the tubing; instead it is injected into the wellbore 26 by a suitable injector 14a while the downhole motor 55 rotates the drill bit 50.

Figure 1B:
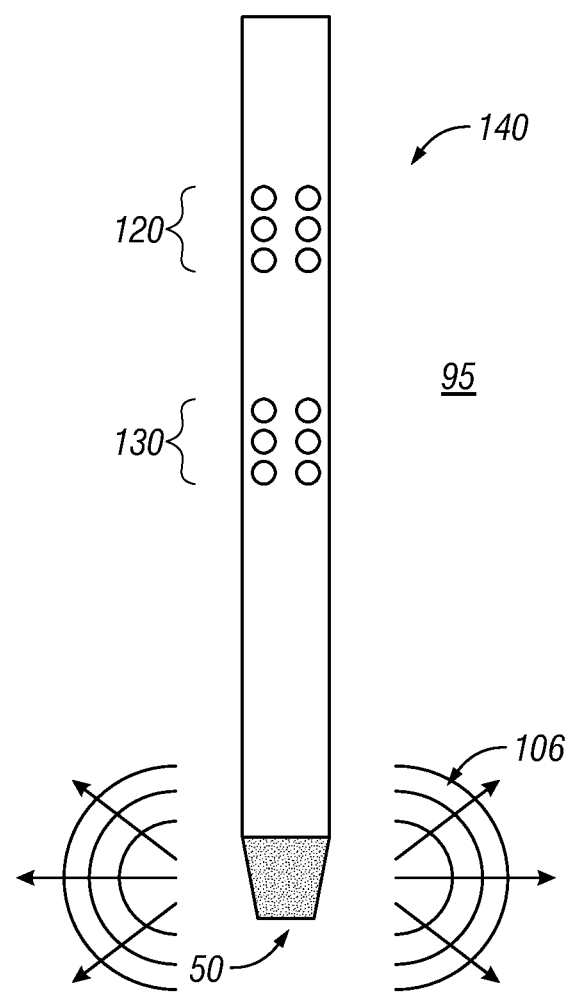
FIG. 1B shows an exemplary LWD tool on a drill collar according to one embodiment of the present disclosure.

FIG. 1B is a schematic view of an exemplary acoustic logging while drilling tool system on a drill collar 140, which may be part of BHA 90. The drill collar 90 may include a drill bit 50. This system is mounted on the drill collar 140 for performing acoustic measurements while the formation is being drilled. The acoustic logging while drilling tool system may use drill bit 50 as a source to emit acoustic vibrations 106 that may traverse formation 95 and may also be propagated along the borehole wall and be received by sensors 120 and 130 which may be in arrays. These sensors are discussed later in the application. As discussed below, the drill bit 50 generates what is generally regarded as noise in a variety of modes such as monopole, dipole, quadrupole and higher order modes. These types of modes are discussed next.

The application of the dipole acoustic technology to LWD has a serious drawback caused by the presence of the drilling drill collar 140 with BHA 90 that occupies a large part of the wellbore 26. The drawback is that the formation dipole shear wave traveling along the borehole is severely contaminated by the dipole wave traveling in the drill collar 140. This is demonstrated by the following theoretical analysis/numerical modeling results.

The dipole wave excitation and propagation characteristics for a borehole with a drilling drill collar are analyzed. Using known analyses methods, for example the analyses of the type described in Schmitt (1988), one can calculate the velocity dispersion curve for the formation and drill collar dipole shear (flexural) waves. The dispersion curve describes the velocity variation of a wave mode with frequency. In the example, the borehole diameter is 23.84 cm and the inner- and outer diameter of the drill collar is 5.4 and 18 cm. respectively. The inner drill collar column and the annulus column between the drill collar and borehole are filled with drilling mud whose acoustic velocity and density are 1,470 m/s and 1 g/cc, respectively. The drill collar is made of steel (compressional velocity, shear velocity and density of steel are 5,860 m/s, 3,130 m/s, and 7.85 g/cc, respectively). The formation is acoustically slow with compressional velocity of 2,300 m/s, shear velocity 1,000 m/s, and density 2 g/cc. It is to be noted that the example is for illustrative purposes only and not intended to be a limitation on the scope of the present disclosure.

Figure 2:
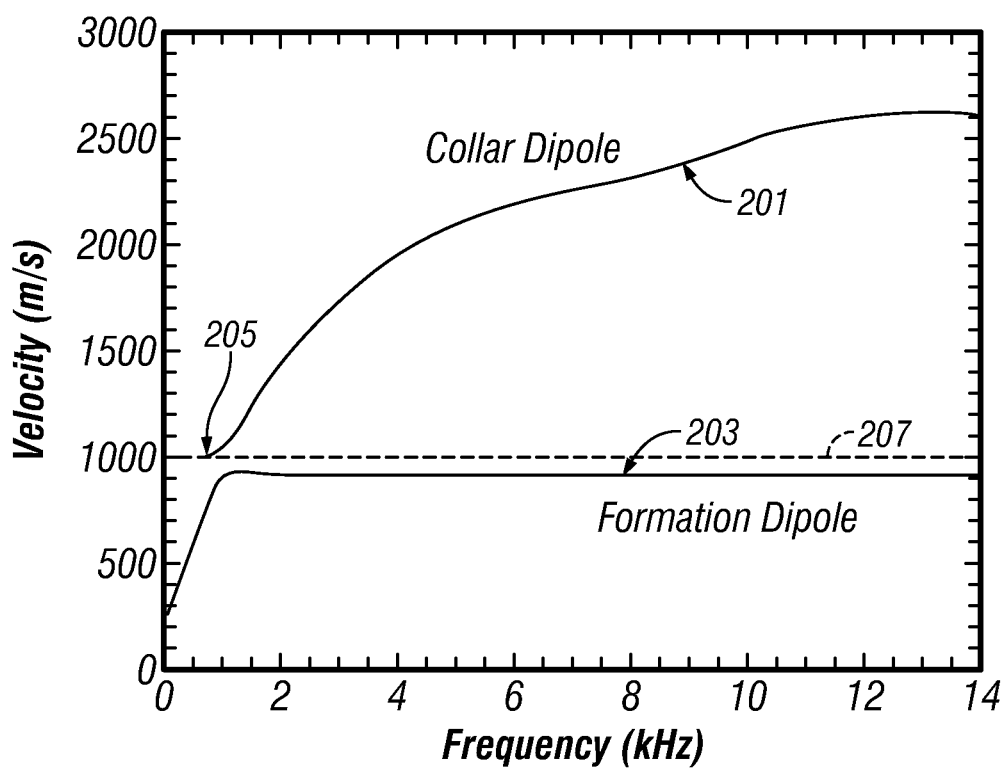
FIG. 2 illustrates velocity dispersion curves for formation and drill-drill collar dipole modes.

The calculated drilling drill collar and formation flexural wave dispersion curves for dipole modes are shown in FIG. 2, for the frequency range shown as the horizontal axis of 0 to 14 kHz. The drill collar dipole wave dispersion curve 201 displayed along the vertical axis shows how velocity of the drill collar dipole wave varies with frequency over the range 0 to 14 kHz. The formation dipole wave dispersion curve 203 shows that except for low frequencies in this range, there is relatively little change in velocity. The formation and drill collar flexural wave modes coexist almost for the entire frequency range, except at the very low frequency where the drill collar flexural mode appears to terminate at the formation shear velocity. Below the frequency where the drill collar mode terminates, the formation flexural mode velocity appears to continue the drill collar flexural mode behavior that would exist in the absence of the formation, the velocity decreasing to zero at the zero frequency. This cross-over phenomenon is caused by the strong acoustic interaction between the drill collar and the formation in this dipole excitation situation.

There is a strong interaction between formation and drilling drill collar flexural waves. The fundamental cause of this is that the two wave modes coexist in the same frequency range of interest. There are several drawbacks of the LWD dipole technology for shear velocity measurement. The first is the difficulty in obtaining good quality formation flexural wave measurements in the presence of severe contamination from the drill collar flexural wave. The drill collar wave, being a low-frequency mode, is difficult to suppress using attenuation techniques such as cutting grooves and/or inserting absorptive materials in the drill collar, etc. The second drawback is that the formation flexural wave, even if it could be reliably measured, cannot yield accurate formation shear velocity information because of the drill collar interaction. As can be seen from FIG. 2, the high frequency limit of the drill collar mode approaches the shear velocity of the drill collar and at the frequency 205 where the drill collar dipole mode ceases to exist, the velocity of the drill collar dipole mode is the formation shear velocity 207. The velocity 203 of the formation dipole mode is, at all frequencies, below the formation shear velocity 205. In the absence of a drill collar, when excited at low frequencies, the formation dipole mode would propagate at a velocity equal to the formation shear velocity. Determination of the formation shear velocity from the dispersion curves of either the formation dipole mode or the drill collar dipole mode is not an easy matter. In addition, during drilling operations, there is a strong dipole mode excited by the drillbit 50 that produces additional noise. For the foregoing reasons, it is difficult to measure formation shear wave velocity using the dipole acoustic technology in the LWD environment.

Figure 3A:
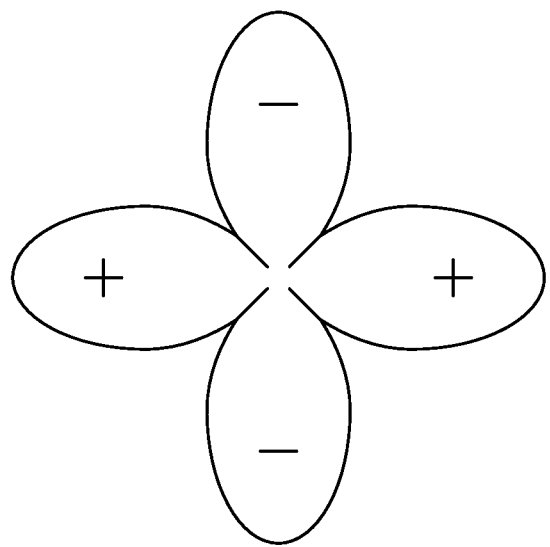
FIG. 3A shows a schematic illustration of a quadrupole wave directivity pattern.

This present disclosure incorporates a quadrupole or higher order multipole acoustic technology for the LWD shear velocity measurement. FIG. 3A shows an illustration of a quadrupole mode directivity pattern. It shows a characteristic four-lobed pattern that may be substantially characterized by a $\cos 2\theta$ angular variation. This directivity pattern may be associated with particle motion (i.e., radial or axial component) or with pressure. The greatest advantage of using the quadrupole wave is that the drill collar quadrupole wave exists only above a certain frequency called the cut-off frequency. This frequency depends on the drilling drill collar thickness and borehole size. Thus, by determining the cut-off frequency for the drill collar and borehole dimensions, one can select a frequency band in which only the collar quadrupole shear wave is severely attenuated. Determining the velocity of the formation quadrupole wave will fulfill the needs for shear wave velocity measurement in the LWD environment.

Figure 3B:
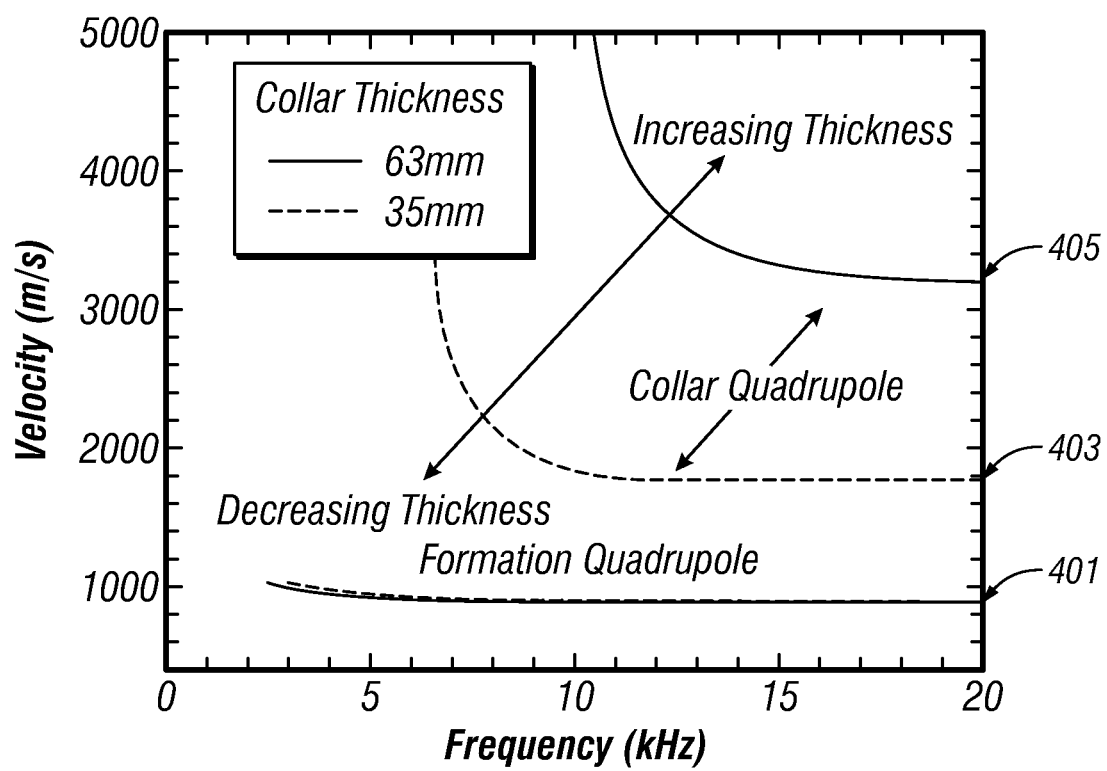
FIG. 3B illustrates velocity dispersion curves for formation and drill-drill collar quadrupole modes.

The feasibility of determining formation shear velocity from quadrupole wave measurement is demonstrated using theoretical/numerical analysis examples. FIG. 3B shows the velocity dispersion curves of the formation 401 and drill collar quadrupole waves 403 and 405. Velocity in meter per second (m/s) is displayed along the vertical axis and frequency in kilohertz (kHz) along the horizontal axis. The velocity dispersion curve for an exemplary drill collar of thickness 35 mm is shown as curve 403. The velocity dispersion curve for an exemplary drill collar of thickness 63 mm is shown as curve 405. The formation quadrupole wave is slightly dispersive and reaches the formation shear wave velocity at a low cut-off frequency (around 2 kHz in this case). This indicates that formation shear wave velocity can be determined as the low frequency limit of the velocity of formation quadrupole waves. The drill collar quadrupole wave velocity curve shows very high values due to the high shear rigidity (steel) and thick wall (63 mm) of the drilling drill collar. The drill collar wave for the 63 mm thick drill collar 405, however, exists only in the frequency range above 10 kHz; whereas, the required frequency for shear velocity measurement of the formation is around 2 kHz, well separated from the frequency range (>10 kHz) of the drill collar wave. This frequency separation allows for designing a method and apparatus to acquire quadrupole waves only in a predetermined frequency band (0-10 kHz in this case). In this band, only the formation quadrupole wave is generated. This wave excitation/generation scheme may be demonstrated using finite difference simulations.

Figure 4A:
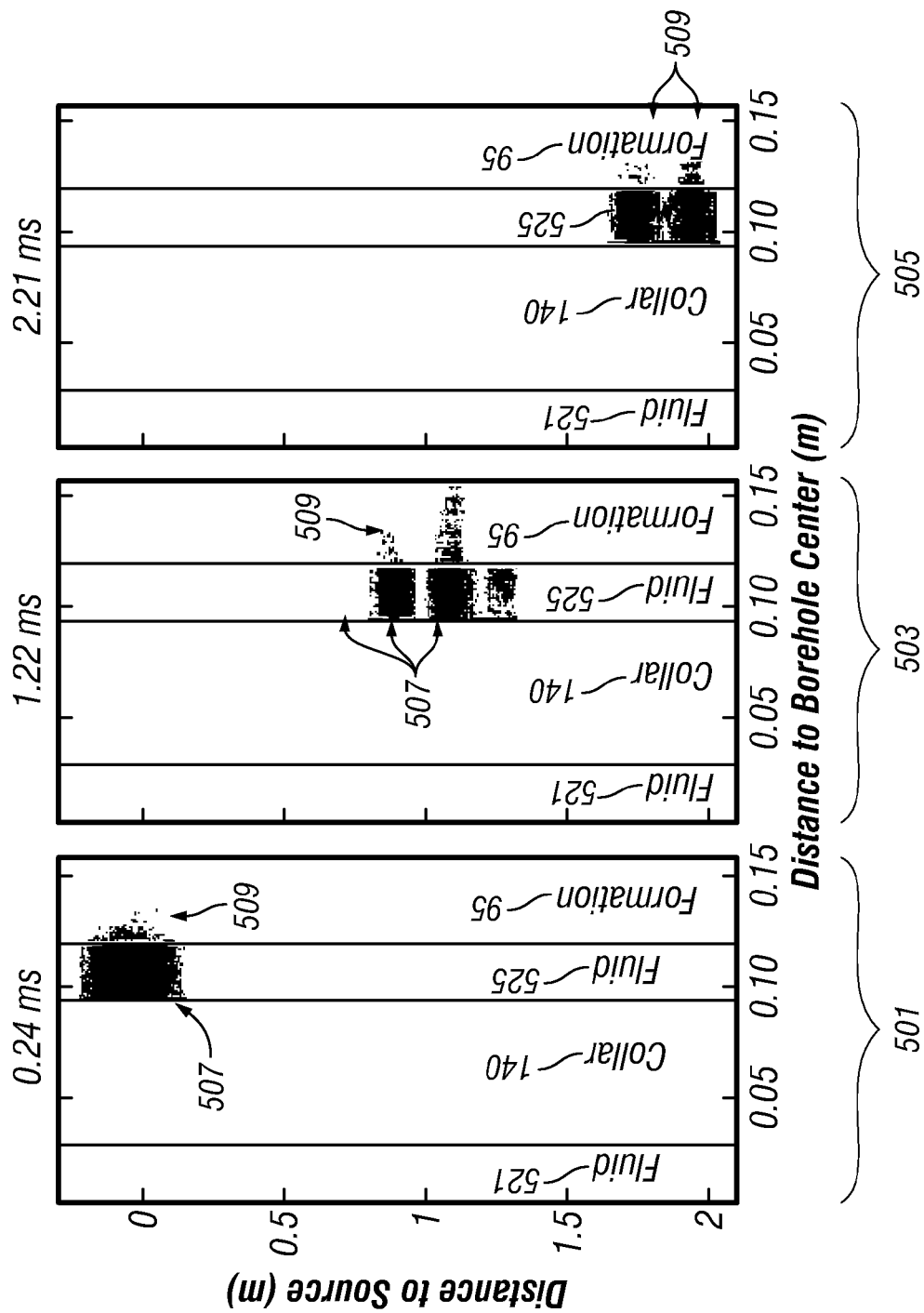
FIG. 4A illustrates wavefield snapshots of acoustic energy near the borehole, where radial particle velocity associated with the quadrupole wave motion is displayed.

In a finite difference modeling, a quadrupole source and an array of receivers with a 0.1524 m spacing are placed at the rim of the drill collar. The source wavelet center frequency is chosen to be 2 kHz, the amplitude spectrum of the source wavelet diminishing to zero at about 5 kHz, which is below 10 kHz, the cut-off frequency of the drill collar quadrupole wave. FIG. 4A shows three snapshots in time of the wavefield intensity due to the quadrupole source. Each snapshot, 501, 503, and 505 is a cross-section displaying a fluid inside the drill collar 521, the drill collar 140, fluid outside the drill collar 525, and a formation 95. Radial particle velocity associated with the quadrupole wave motion is displayed as shaded sections 507, 509. These FIG. 4A snapshots display the locations of wavefield intensity at several instants of time (0.24 milliseconds for 501, 1.22 milliseconds for 503, and 2.21 milliseconds for 505, respectively). In the borehole fluid, annulus high wavefield intensity 507 is seen in the fluid outside the drill collar 525 and high wavefield intensity 509 is seen in the formation 95. The wave motion in the fluid annulus and the motion in the formation are in phase, traveling at the formation shear velocity as demonstrated by the juxtaposition of high wavefield intensity in the fluid 507 and the formation 509 for all three snapshots 501, 503, and 505. This is the formation quadrupole wave as discussed in connection with FIG. 3A. There is almost no discernable wave intensity for locations anywhere inside the drill collar 140 except for the initial time (snapshot 0.24 ms 501) around the source, showing that the drill collar quadrupole wave is not excited in this frequency band for this drill collar 140 thickness (2.48 inches).

Figure 4B:
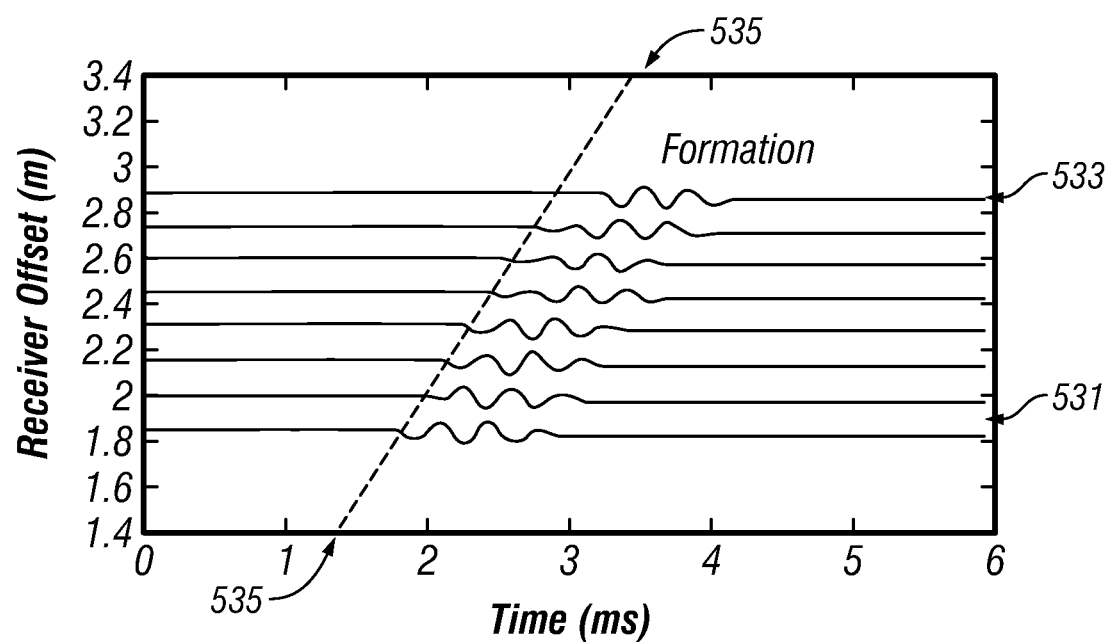
FIG. 4B illustrates quadrupole waveforms at various offsets.

The time-domain quadrupole waveforms of the receiver array are displayed in FIG. 4B where time is represented along the horizontal axis. Quadrupole acoustic waveforms are displayed by offset corresponding to source-receiver distance along the vertical axis in FIG. 4B. Receiver locations are spaced 0.1524 m apart beginning with the near trace waveform at 1.833 m 531 to 2.9 m 533 offset from the source. FIG. 4B shows only one wave, the formation quadrupole wave, traveling across the array at the formation shear velocity. The dashed line 535 marks the formation quadrupole wave first arrival. This time-domain wave simulation result is consistent with the frequency domain dispersion analysis result of FIG. 3B. These examples demonstrate that choosing an appropriate wave excitation frequency band can eliminate drill collar quadrupole waves.

The receiving frequency band should be selected based on the drilling drill collar and borehole dimensions. In drilling practice, the size of the borehole is varied to suit exploration/production needs and/or geological environment of the well to be drilled. Accordingly, the size of the drilling drill collar also varies. The change of the drill collar and borehole dimensions, especially the former, will significantly change the drill collar quadrupole wave characteristics. This, again, can be demonstrated using theoretical/numerical analysis examples. The quadrupole dispersion curves for a 35 mm thickness drilling drill collar (dashed curves) are shown in FIG. 3B. With the thinner drill collar, the formation quadrupole dispersion curve (dashed line 403) is also changed. The cut-off frequency of the formation mode is raised to about 3 kHz and the whole curve exhibits higher values compared to the thick drill collar case (solid curve 405). The curve approaches the formation shear wave velocity at low frequencies. On the other hand, the drill collar quadrupole wave velocity is much reduced compared to the thick drill collar case (solid curve 405) and shows a much lower cut-off frequency (about 6 kHz). The general trend shown in FIG. 3B is that increasing the drill collar thickness will move the frequency band of the drill collar quadrupole wave away from that of the formation quadrupole wave. When the frequency band of the drill collar quadrupole wave is close to that of the formation quadrupole, measurement of the formation quadrupole wave will be severely impaired, as the following wave simulation example demonstrates.

Figure 5A:
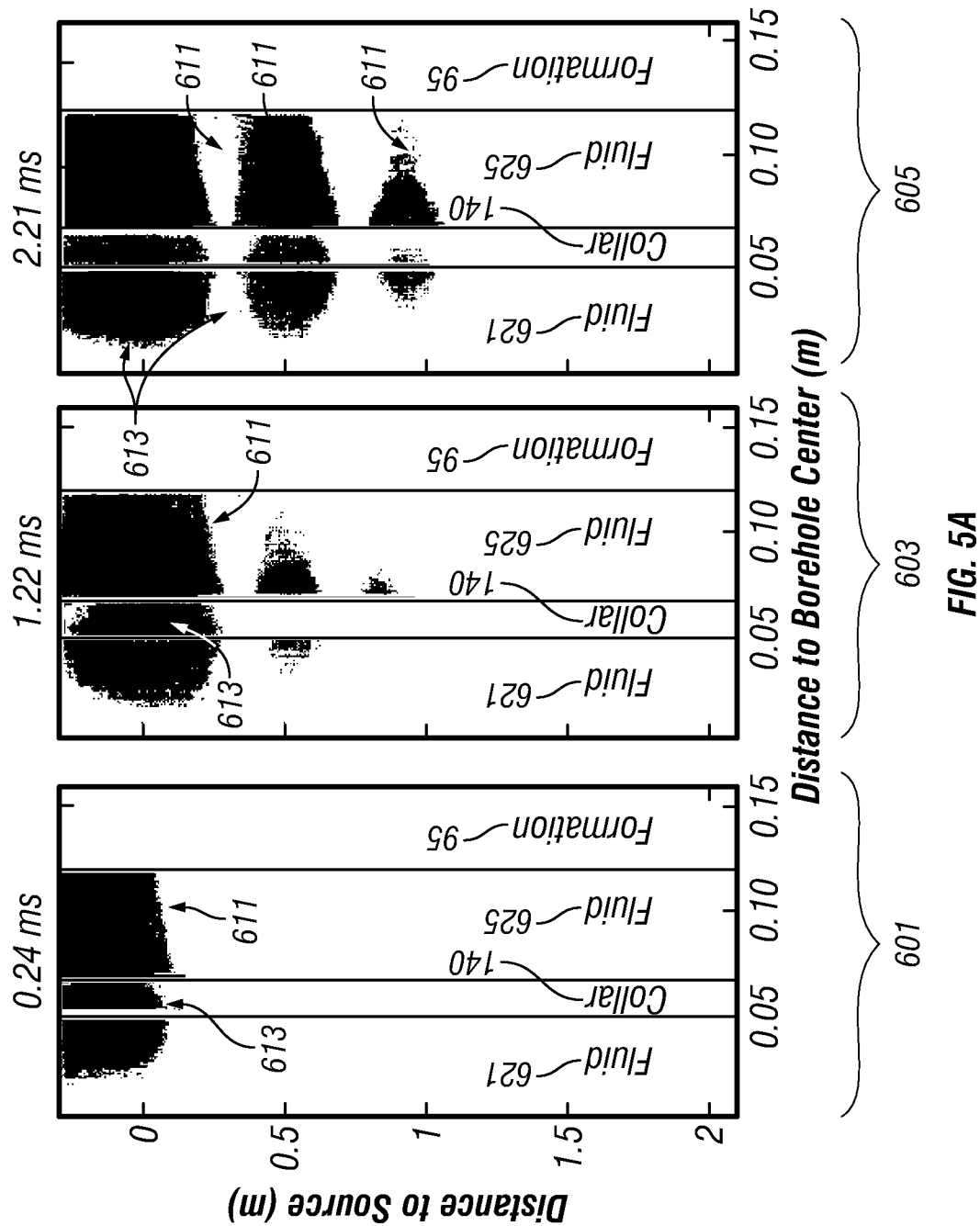
FIG. 5A illustrates wavefield snapshots of acoustic energy near the borehole, where radial particle velocity associated with the quadrupole wave motion in a thin-drill collared pipe is displayed.

The example case is where the drill collar pipe is relatively thin (thickness is only 16 mm or 0.63 inches). The cut-off frequency of the drill collar quadrupole wave is now about 3.5 kHz. Other parameters, as used in the simulation of FIG. 4B, are kept unchanged. With the 2 kHz center excitation frequency, both formation and drill collar quadrupole waves are excited. FIG. 5A is the counterpart of FIG. 4A, showing the wavefield snapshots for the 16 mm thick drill collar case. FIG. 5A shows three snapshots in time of the wavefield intensity due to the quadrupole source. Each snapshot, 601, 603, and 605 is a cross-section displaying a fluid 621 inside the drill collar, drill collar 140, fluid 625 outside the drill collar, and a formation 95. Radial particle velocity associated with the quadrupole wave motion is displayed shaded 611, 613. These FIG. 5A snapshots display the locations of wavefield intensity at several instants of time (0.24 milliseconds for 601, 1.22 milliseconds for 603, and 2.21 milliseconds for 605, respectively). In the borehole fluid 625 annulus high wavefield intensity is seen 611 and high wavefield intensity is seen in the drill collar 613. For all the three time instants 601, 603, and 605, the wavefield intensity in the entire borehole containing the drill collar 140 is dominated by the drill collar quadrupole wave. Formation quadrupole wave is weakly excited, which is out of phase with the drill collar wave.

Figure 5B:
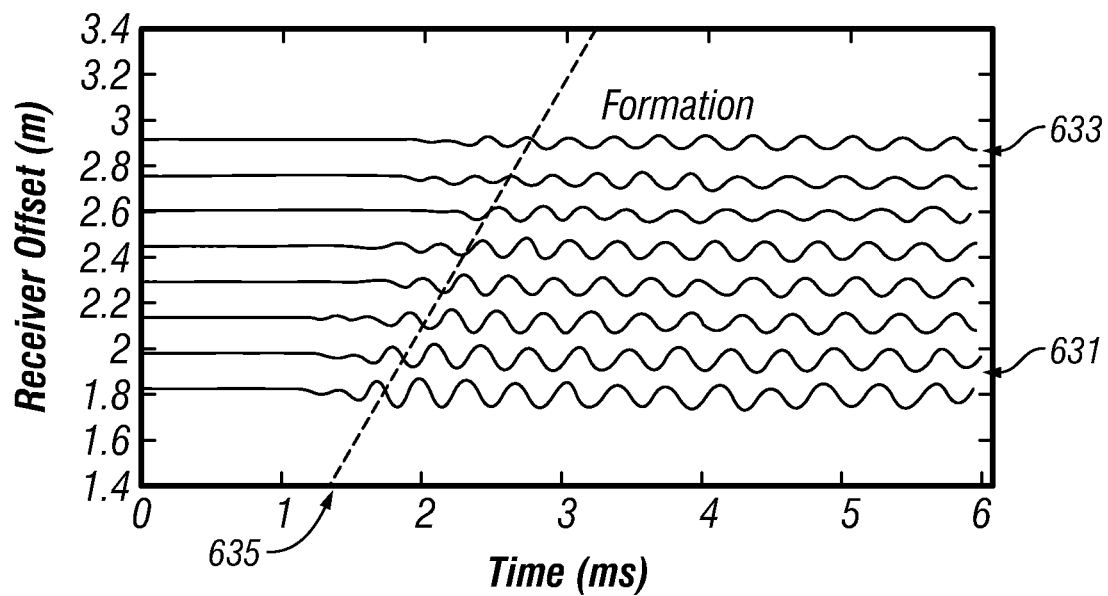
FIG. 5B shows time domain displays of the data in FIG. 5A.

The time domain array waveforms are shown in FIG. 5B. The time-domain quadrupole waveforms of the receiver array are displayed in FIG. 5B where time is represented along the horizontal axis. Quadrupole acoustic waveforms are displayed by offset corresponding to source-receiver distance along the vertical axis in FIG. 5B. Receiver locations are spaced 0.1524 m apart beginning with the near trace waveform at 1.833 m 631 to 2.9 m 633 offset from the source. The time domain waveforms are dominated by the drill collar quadrupole wave that has a moveout velocity of about 1,300 m/s. The dashed line 635 represents the arrival time for the formation quadrupole wave. In this case, it is difficult to measure the formation quadrupole wave in the presence of the strong drill collar wave. This example demonstrates the importance of the frequency band selection for the LWD quadrupole wave generation and measurement devices.

The above examples demonstrate the advantage of the quadrupole shear wave in the LWD environment and the requirements that facilitate making the LWD quadrupole shear wave measurement. The interaction of the pressure/stress wave in the borehole 26 and formation 95 will produce a formation quadrupole shear wave to propagate axially along the borehole. An important feature of quadrupole and higher order multipole signals is the existence of a cutoff frequency for the drill collar mode, so that signal processing is considerably simplified.

The quadrupole (or higher order) shear wave in the earth formation 95 produced by the drill bit 50 may be detected at locations spaced longitudinally along the borehole 26 from the drill bit 50, as schematically illustrated in FIG. 1B. FIG. 1B is a schematic view of an acoustic logging while drilling tool system on a BHA drill collar 140 containing a drill bit 50. This system is mounted on the BHA drill collar 140 for performing acoustic measurements while the formation is being drilled. The acoustic logging while drilling tool system may use drill bit 50 to emit acoustic vibrations 106 that may traverse formation 95 and be received by sensors A and B which may be in arrays. The use of arrays with axially spaced apart elements as shown in FIG. 1B makes it possible to use well-known phased array filtering techniques for attenuating signals traveling in a particular direction with a specified range of velocities. In one embodiment of the present disclosure, this phased array filtering may be used to attenuate noise generated by the borehole. The phased array filtering may also be used to attenuate the drill collar mode by defining a range of velocities to be attenuated. In an alternate embodiment of the present disclosure, a plurality of axially spaced apart transmitter elements is used and the phased array filtering is used to reduce the generation of drill collar mode signals.

Figure 6:
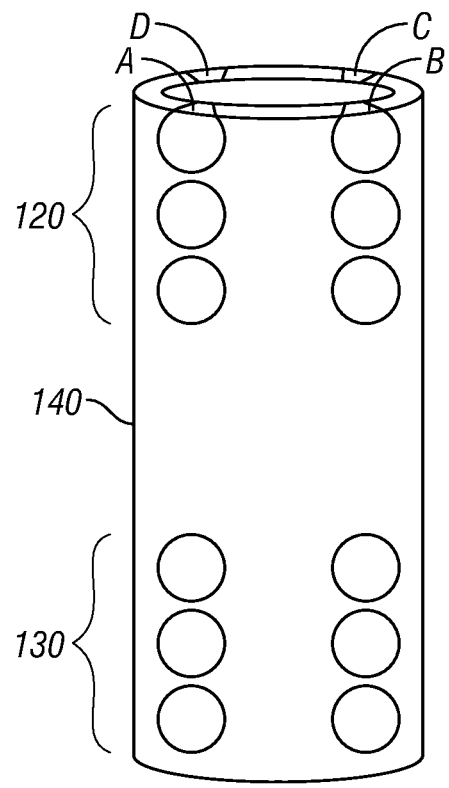
FIG. 6 is a perspective view of an exemplary sensor layout around the drill collar according to one embodiment of the present disclosure.

As shown in FIG. 6, for one embodiment of the present disclosure, acoustic detectors 120, 130 may be mounted at the rim of the drilling drill collar 140. Each detector 120, 130 may include four matched sensors equally spaced circumferentially spaced around the drill collar 140, for example sequentially named as A, B, C, and D. FIG. 6 is a perspective view of an exemplary sensor layout around the drilling drill collar 140. The detectors 120, 130 are spaced axially along the drill collar 140 such that one of the detectors 120 is further from the drill bit 50 than the other detector 130. The detectors 120, 130 may include an array of four-sensor layers. The four-sensor detectors 120, 130 act to enhance the efficiency of the drill bit 50 as a multipole source and to remove possible contamination from a monopole component of the wave signal.

Figure 7:
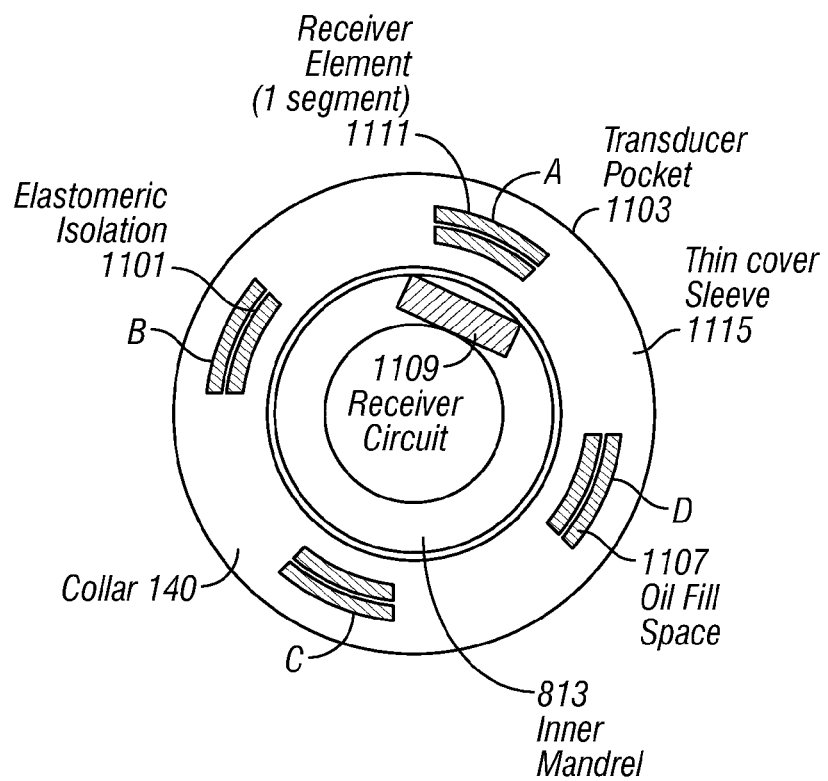
FIG. 7 illustrates a detailed cross-sectional view of an exemplary segmented ring receiving sensor implementation according to one embodiment of the present disclosure.

An actual implementation of the quadrupole shear wave receivers as quadrupole detector arrays is now described in more detail. Quadrupole receivers are discussed for example and illustration only, as other multipole receivers (e.g., hexapole, octopole, etc.) may be used in some embodiments for determination of slowness of the formation. FIG. 7 illustrates a detailed cross-sectional view of an exemplary segmented ring receiving sensor implementation which has a segmented ring mounted on an elastomeric isolation component 1101 in a continuous pocket 1103 around the drill collar 140. The isolation is used to reduce drill string induced signals. The sensors A-D can be oil-filled 1107 with a cover sleeve 1115, as illustrated or it can be a potted assembly, requiring no oil. An electronic signal conditioning circuit(s) 1109 is coupled to the receiver element(s) 1111 to sense acoustic signal(s) in the borehole and formation. The receiver circuit 1109 may reside within the inner mandrel 813. The receiving element(s) can be implemented in various forms that may include, but are not limited to, rings, cylinders, plates, and piston or solenoid elements. The number of segments can be increased in a circumferential and/or axial direction as needed. The material for the receiver elements may be selected from a piezoelectric material, an electrostrictive material; and, a magnetostrictive material.

Figure 8:
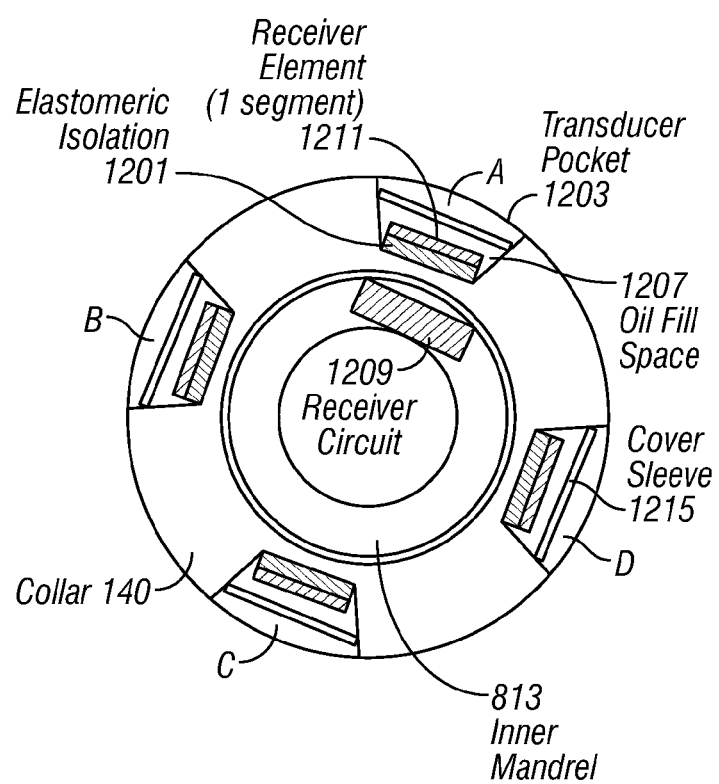
FIG. 8 illustrates a detailed cross-sectional view of an exemplary compartmentalized segmented receiving sensor implementation according to one embodiment of the present disclosure.

FIG. 8 illustrates a detailed cross-sectional view of an exemplary compartmentalized segmented receiving sensor implementation which has receiver sensors (segments) 1211 mounted on individual elastomeric isolation components 1201 in compartmentalized pockets 1203 around the drill collar 140. The inner mandrel 813 may hold receiver circuit 1209, which is coupled with a receiver sensor 1211. The receiver sensor 1211 may have a cover sleeve 1215 with an oil filled space 1207 in between.

Figure 9:
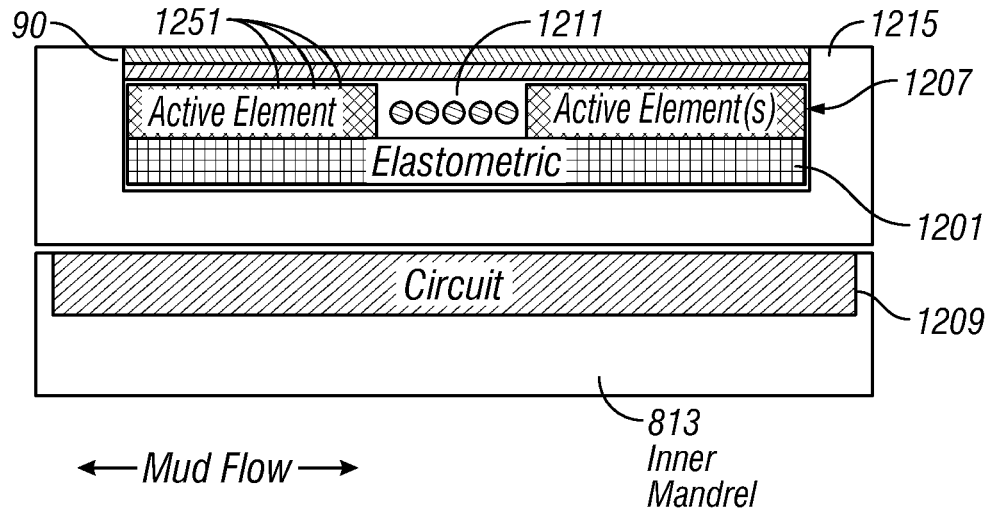
FIG. 9 illustrates a side view of a portion of the device of FIG. 8.

FIG. 9 shows a side view of a receiving sensor. The drill collar 140 may include a transducer element 1211 that includes a plurality of active elements 1251. The other components in FIG. 9 are as in FIG. 8 and are not discussed further.

The signals received from, for example, the FIG. 6 sensors A, B, C, and D may be combined as (A+C)−(B+D). The generated quadrupole wave arriving at the sensors A, B, C, and D can be described as follows. Sensors A and C will see, respectively, a pressure wave of the same polarity and amplitude, and sensors B and D, a pressure wave of the same amplitude but reversed polarity. Therefore, adding the signals from A and C and subtracting the signals from B and D, as (A+C)−(B+D), will produce a signal four times stronger than each individual signal of one sensor. The low frequency monopole wave motion is substantially homogeneous inside the borehole, such that each individual sensor will measure substantially the same monopole wave signal. This monopole wave can be canceled out by the combination (A+C)−(B+D). The dipole wave can be enhanced by the combination (A+B)−(C+D). Similar methods can be used for enhancing octupole signals with eight sensors. This combination of the outputs of the sensors is performed for each acoustic detector An alternative embodiment of the present disclosure is the low-pass filtering of the signals recorded by each sensor below the cut-off frequency of the drill collar quadrupole wave. If the source pulses have high frequencies and are not modulated, or if the quadrupole component of the drilling noise has frequency content above the cut-off frequency of the drill collar quadrupole wave, then the drill collar quadrupole wave will be excited and recorded by the sensors. Because the drill collar quadrupole wave exists only above its cut-off frequency, it can be removed by low-pass filtering the sensor signals below the cut-off frequency. As stated above, this cut-off frequency can be determined from the borehole and drilling drill collar dimensions. Thus the low-pass filter can be designed and installed as a part of the sensor data acquisition and processing system.

For signal coherence enhancement and processing purposes, arrays of the above-mentioned detectors/receivers are placed axially along the drilling drill collar 140. The spacing between the adjacent detectors typically ranges from 0.5 to 1 ft (0.1524 to 0.3048 m). The formation shear wave velocity may be determined by correlating the quadrupole shear wave across the receiver array using any standard array processing method, such as the method taught in U.S. Pat. No. 5,441,890 to Tang. Herein, signal coherency is a property of two waveforms having a well-defined phase relationship, i.e. being in-phase.

Figure 10A:
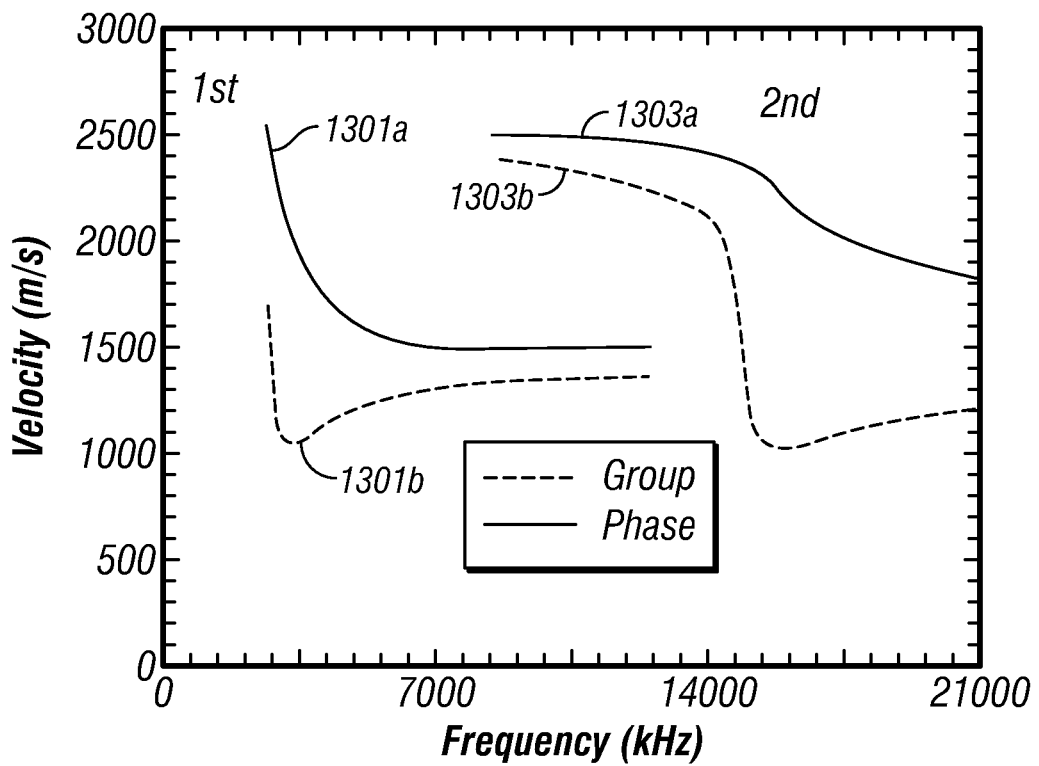
FIG. 10A illustrates shear velocity and compressional velocity in "fast" formations.
Figure 10B:
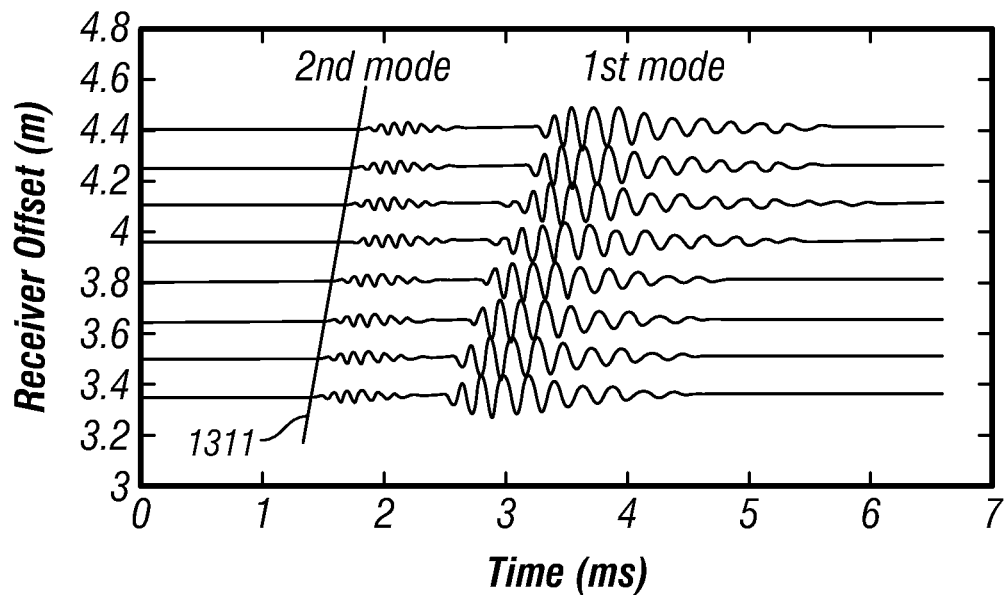
FIG. 10B shows the higher order quadrupole modes in a fast formation.

The above discussion has been directed towards determination of formation shear velocities by what would be recognized by those versed in the art as the first order mode. In "fast" formations where the shear velocity exceeds the compressional velocity in the borehole fluid (borehole fluid compressional slowness exceeds the formation shear slowness), higher order modes may exist. This is illustrated in FIG. 10A. The abscissa is the frequency and the ordinate is the velocity. 1301a and 1301b show an example of the phase and group velocities of the 1st order quadrupole mode while 1303a and 1303b show the phase and group velocities of the 2nd order mode. The formation shear- and compressional-wave velocities are 4,500 and 2,500 m/s, respectively; the drilling drill collar and borehole dimensions and other related parameters are the same as in FIG. 4B. The waveform simulation uses a 5 kHz center-frequency source. Two quadrupole modes exist in the frequency range below 21 kHz. They are named the first and the second quadrupole mode, respectively, with the higher order mode existing in a higher frequency range. For the example in FIG. 10A, the first and the second mode starts to appear from about 3 and 8 kHz, respectively. The first mode shows a steeply decreasing phase dispersion curve 1301a with a well-defined group velocity 1301b minimum. The presence of the group velocity minimum produces a phenomenon called the Airy phase. The associated waveforms are shown in FIG. 10B. The wave energy associated with the Airy phase dominates the waveforms and lags significantly behind the formation shear-arrival time 1311, as shown in FIG. 10B. In this situation, it is difficult, if not impossible, to measure the fast formation shear-wave velocity from the waveform data for the first mode.

Measuring the waveform of the second quadrupole wave mode can directly determine the fast formation shear velocity. As shown in FIG. 10A, in a broad frequency range above the cut-off frequency, the phase velocity curve of the second mode is very close to the formation shear velocity (2,500 m/s in this case). Both the phase and group velocity curves of the second mode are quite flat, indicating minimal dispersion effects. In fact, the quadrupole wave excited in this higher frequency range, which is associated with the second mode, propagates at the formation shear-wave velocity, as illustrated in FIG. 10B. Since the second quadrupole mode of the formation can be effectively excited below the frequency range of the drill collar quadrupole, the interference from the latter mode can still be avoided or minimized. As shown in FIG. 10B, there is no discernable wave energy associated with the drill collar quadrupole.

The above examples have used a unitary drill collar 140 to illustrate the principles of using quadrupole mode wave propagation for determination of formation shear properties in a LWD environment. For practical reasons, the logging tool of the present disclosure may comprise multiple segments of drill collars with transmitters and receivers on different segments of the drill collar 140. The principles described above are equally applicable to such segmented drill collars and are intended to be within the scope of the present disclosure. It is possible that the cut-off frequency and the dispersion curves may be different for each segment of the drill collar. This does not affect the principles of operation of the logging tool.

Figure 11A:
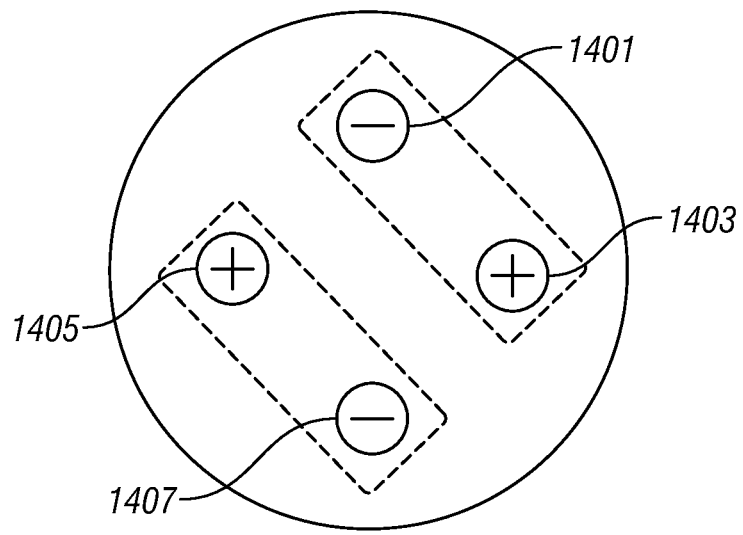
FIG. 11A shows the equivalence of a quadrupole to a pair of dipoles.

The above examples have further illustrated the implementation of quadrupoles by at least two pairs of matched "monopole" elements wherein elements within each pair move in unison. An alternative method for reception of a quadrupole signal is possible using two dipoles, such as bender bars. This is illustrated in FIG. 11. The elements 1401, 1403 comprise one dipole, e.g., a first bender bar, and the elements 1405, 1407 comprise a second dipole, e.g., a second bender bar. The motion of the bender bars is not radial: it is orthogonal to a radial line joining the center of the tool to the midpoint of the bender bar; nevertheless, a significant quadrupole signal may be excited or received by the configuration shown in FIG. 11. Such an implementation is intended to be within the scope of the present application.

Figure 11B:
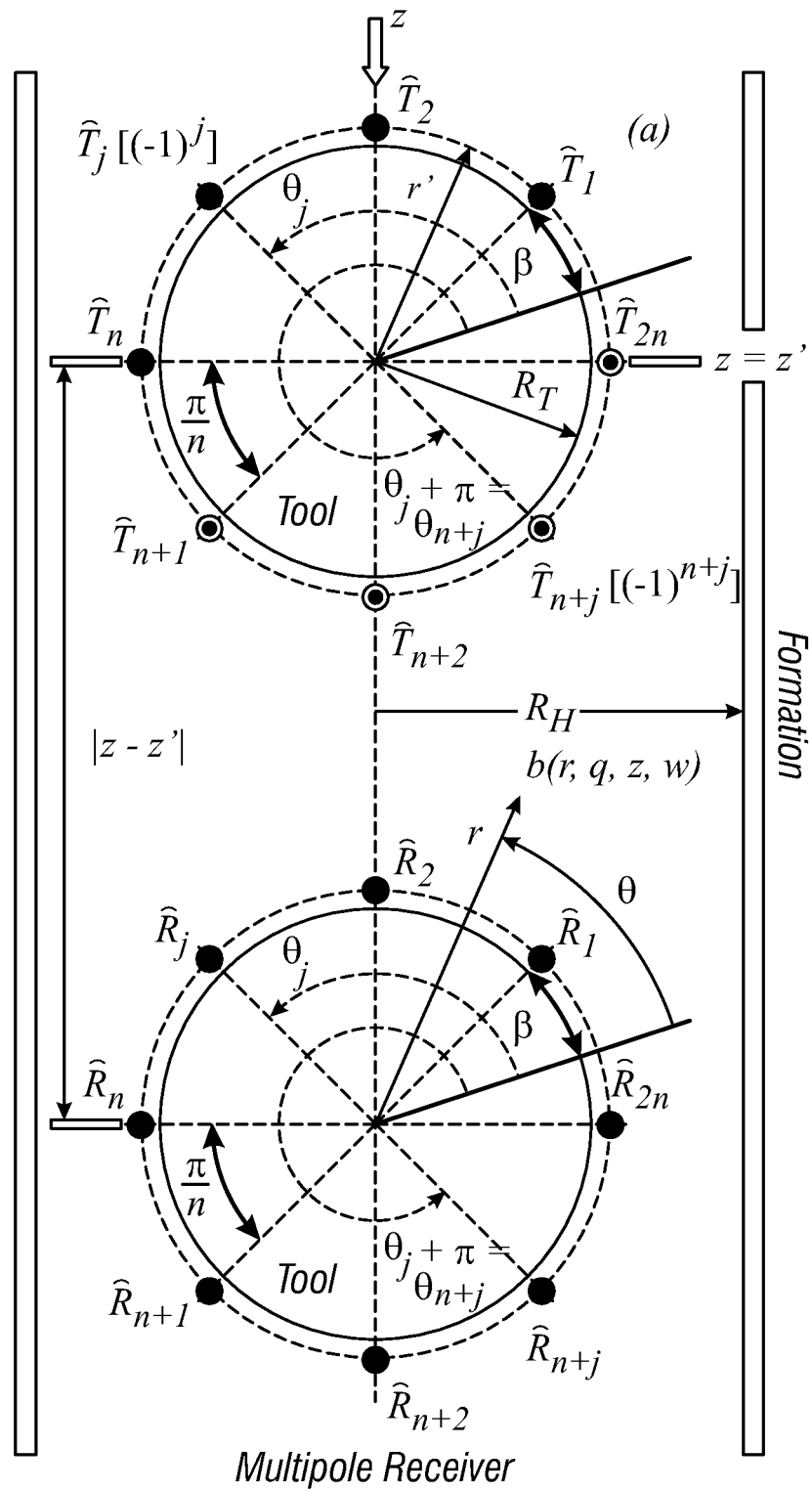
FIG. 11B shows a multipole transmitter and a multipole receiver and related geometrical terms.

Multipole logging may be used to obtain quality formation shear slowness information in formations that have shear slowness that is greater than the borehole fluid slowness. Herein, multipole logging refers to the use of at least one multipole source and at least two multipole receivers, where the multipolar value of the source and the receivers is the same and equal to 2n, where n (≥1) is an integer, often referred to as the multipole order. Also, in standard multipole logging operations the individual source/receiver elements that make up the multipole source/receiver are azimuthally offset by $\pi/n$ radians and are axially aligned (FIG. 11B).

Furthermore, under the most ideal circumstances all source elements that make up the multipole transmitter and all receiver sensor elements that make up the multipole receiver are amplitude and phase matched and for shear slowness applications the 2n source elements are excited with alternating polarity. Assuming the tool being centered in a fluid-filled borehole, this assures the maximum possible signal to noise ratio for the n-th order multipole mode after an alternate polarity stack of the 2n receivers (See equation below). With reference to FIG. 11B, the following mathematical expression can be obtained for this particular case:

$$\sum_{j=1}^{2n}(-1)^j \hat{R}(r,\theta_j,z) \propto (2n)^2 \hat{T} \sum_{k=0}^{\infty} \hat{C}_{(2k+1)n}(r,z), \quad (1.1)$$

$$n = 1, 2, 3, \ldots$$

where $$\theta_j = \beta + (j-1)\frac{\pi}{n}, \quad (1.2)$$

is the azimuth associated with the j-th source and receiver element and where $\hat{C}_{(2k+1)n}(r,z)$ is the spectral amplitude of mode (2k+1)n (Also referred to as modal Green's function). We also note that this mode is enhanced (due to the stacking) by a factor $4n^2$ (Cf., Eq.(1.1)). For the earlier discussed quadrupole case (n=2) this yields a stacking factor of 16, which equates to a signal to noise improvement by a factor of 4. Furthermore, it can be observed from the right-hand side of Eq.(1.1) that the leading term (k=0) is always $\hat{C}_n(r,z)$, which for the quadrupole excitation implies that $\hat{C}_0$ (Monopole mode), $\hat{C}_1$ (Dipole mode [This includes dipole collar mode]), $\hat{C}_3$ (Hexapole mode), $\hat{C}_4$ (Octopole mode) and $\hat{C}_5$ (Decapole mode) all vanish. The first non vanishing mode is $\hat{C}_6$ which has a 'low' frequency cut-off far above that of the quadrupole mode and attains much lower amplitudes (The higher the modal order, the lower the amplitude). In Eq.(1.1), $\hat{T}$ represents the spectral amplitude of one of the sources.

Similarly, if the 2n sources are fired at equal polarity and an equal polarity stack is applied to the 2n multipole receiver elements, the following mathematical expression can be obtained $$\sum_{j=1}^{2n} \hat{R}(r,\theta_j,z) \propto (2n)^2 \hat{T} \sum_{k=0}^{\infty} \hat{C}_{2kn}(r,z), \quad (1.3)$$

$$n = 1, 2, 3, \ldots$$

From the right-hand side of Eq.(1.3) it is clear that the leading term (which always has the highest amplitude) always is the monopole wavefield, $\hat{C}_0$. For the earlier discussed case, n=2, this implies a signal to noise improvement by a factor of 4, the same as in the quadrupole case. Furthermore, the second non-vanishing mode occurring in Eq.(1.3) is $\hat{C}_{2n}$, which becomes the octopole mode ($\hat{C}_4$) for n=2. In view of the ever decreasing amplitude and increasing cut-off frequency of $\hat{C}_k$ (k>1), it follows that a 'perfect' monopole can be obtained when n→∞ (In agreement with physical insight).

However, as it turns out, Eqns. (1.1) and (1.3) with slight modification, are valid for any source excitation (Any wavefield can be decomposed in a (infinite) sum of cylindrical waves, cf., Eq.(1.1), the only thing that changes is the constant $(2n)^2 \hat{T}$. This term should be looked upon as an 'effective' source signature.

The drill bit 50 may be considered such an 'effective' source during normal operation. The signal from drill bit 50 may be decomposed into cylindrical waves. Since drill bit 50 is an eccentered source, it may generate an infinite number of cylindrical borehole modes, each having a unique directional characteristic. Multipole modes may be obtained from a multipole receiver configuration assuming an effective source. Drill bit 50 may provide a high power low frequency effective source such that the multipole mode amplitudes exceed the amplitudes of the flow noise in a certain range of frequency. For example, the use of a quadrupole signal may vary with the thickness of the drill collar 140, where the drill bit 50 may emit a quadrupole collar mode above a frequency, such as around 5 kHz. Hence, low frequencies, below 5 kHz may be free of a quadrupole collar mode. Using the drill bit 50 as an effective source, formation slownesses maybe obtained from multipole array data by adequate stacking of multipole receiver data (Cf., Eq. (1.1) and Eq. (1.3)). Especially, quadrupole and hexapole data acquired in this way can be used to obtain formation shear slowness.

Figure 12:
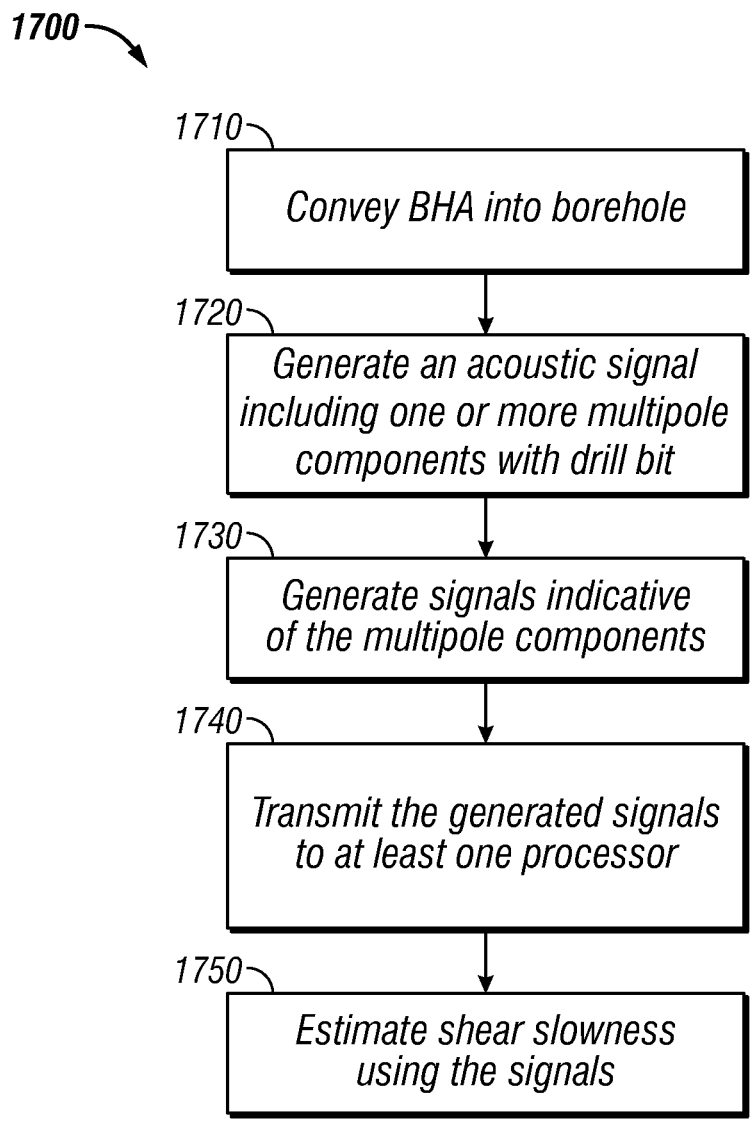
FIG. 12 shows a flow chart of an exemplary method according to one embodiment of the present disclosure.

FIG. 12 shows an exemplary method of one embodiment according to the present disclosure. In method 1700, the BHA 90 is conveyed into the borehole 26 in step 1710. In step 1720, the drill bit 50 is rotated and generates an acoustic signal that includes one or more multipole components during rotation. In step 1730, the detectors 120, 130 may generate signals indicative of the multipole components received by the detectors 120, 130. In step 1740, the signals indicative of the multipole components may be transmitted to at least one processor. In step 1750, the at least one processor uses the signals to estimate the shear slowness of the formation.

Figures 13A, 13B:
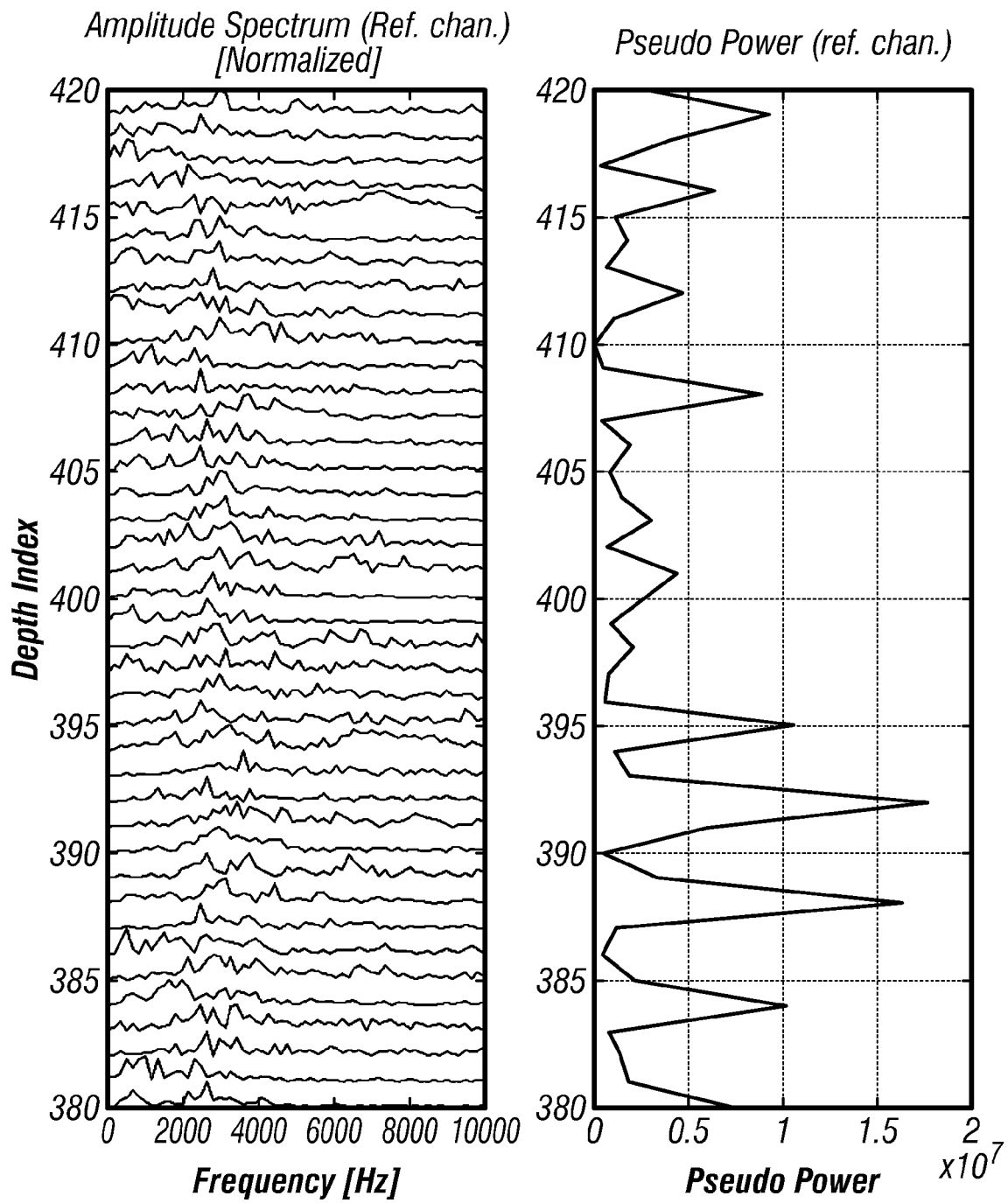
FIG. 13A shows the amplitude spectrum of a quadrupole wave generated using one embodiment of the present disclosure.
FIG. 13B shows the power spectrum of a quadrupole wave generated using one embodiment of the present disclosure.

FIG. 13A shows that, in one embodiment, the quadrupole wave generated in step 1720 has amplitude across a variety of frequencies and depth indices. Below 2 kHz drilling noise derived quadrupole data shows lower amplitudes than above because of a 2 kHz high pass hardware filter built in the receiver boards. If the high pass filter were to be removed, drilling noise obtained quadrupole data would have much higher amplitudes at those frequencies. In that case it can be expected that shear slowness obtained from drilling noise obtained quadrupole data will have much higher coherency and will be much more accurate than that obtained from current quadrupole sources.

FIG. 13B shows that there is considerable power in the quadrupole mode signal.

FIG. 14A shows the correlogram of signals generated in step 1720. The correlograms have been stacked to produce the output. The abscissa is the slowness in μs/ft and the ordinate is the depth. The correlogram represents the result of stacking the combined output of each of the acoustic detectors at a particular slowness. The selection of the slowness is done by stacking the signals (such as in FIG. 5B) over a range of times and a range of slownesses, finding the maximum of the stack in the slowness-time domain. What is displayed in FIG. 14A is the maximum coherence of the stacked signal. This is called the Slowness-time-coherence (STC). FIG. 14B shows the coherencey at the picked slowness 1401 and shows that the coherency is stable across the range of depths. FIG. 14C shows the correlograms recorded over the interval indicated by the arrows using a 2 kHz quadrupole acoustic source while FIG. 14D shows the coherency at the picked slowness 1403.

Two points are worth noting. Firstly, the picked slowness 1401 using a drillbit source is in good agreement with the picked slowness 1403 using a 2 kHz quadrupole source. Secondly, the coherency at the picked slowness 1402 with the drillbit source is higher than the coherency 1404 with the 2 kHz quadrupole source. The observations made above also apply to hexapole and higher order multipole data. Specific examples are not shown here for hexapole and higher order multipole data.

Those versed in the art and having benefit of the present disclosure would also recognize that if the sensor elements of each detector are combined to respond to a propagating monopole signal, the processing discussed above can be used to estimate the slowness of the compressional wave and/or Stoneley wave in the formation. As discussed above, there is no cutoff frequency for a propagating monopole tool signal, so conventional prior art methods (such as using an attenuator) for attenuating a propagating compressional tool mode become more important. The advantage of measuring the monopole signal in addition to the multipole signals is that both formation compressional and formation shear velocities can be obtained without a specially designed acoustic source.

Those versed in the art and having benefit of the present disclosure would recognize that the operations of stacking of data from different detectors and the combination of outputs of different sensors in a detector are linear operations and are hence commutative. Accordingly, it is possible to do a coherency-slowness stack signals from a particular azimuth of each of the detectors. The resulting stack will include all the modes that are generated by the drillbit and propagating through the formation. The maximum of the multipole stack of the azimuthal stack can then give the slowness for the selected multipole. This is more intensive in terms of computer memory and computer time than is the method discussed above of doing the multipole stack followed by the coherency stack. For the purposes of the present disclosure, the monopole signal can be regarded as a multipole signal of order 0. See eqn. (1.1) and the related discussion.

The processing of the data may be conveniently done on a processor. The processor executes a method using instructions stored on a suitable computer-readable medium product. The computer-readable medium may include a ROM, an EPROM, an EAROM, a flash memory, and/or an optical disk.

While the foregoing disclosure is directed to the one mode embodiments of the disclosure, various modifications will be apparent to those skilled in the art. It is intended that all variations be embraced by the foregoing disclosure.

We claim:

1. An apparatus configured to evaluate an earth formation, the apparatus comprising:
    a bottomhole assembly (BHA) configured to be conveyed in a borehole;
    a drillbit on the BHA configured to generate an acoustic signal including multipole components propagating through the earth formation during continued rotation of the BHA;
    a drill collar on the BHA coupled to the drillbit, wherein the drillbit and drill collar are configured, when rotating at a frequency in a predetermined frequency band, to generate multipole components propagating through the earth formation substantially free of multipole components propagating through the drill collar;
    a first acoustic detector on the BHA configured to produce a first signal indicative of the multipole components contained in the propagating acoustic signal;
    a second acoustic detector on the BHA axially spaced apart from the first acoustic detector and configured to produce a second signal indicative of the multipole components contained in the propagating acoustic signal; and
    at least one processor configured to estimate a formation velocity of the earth formation using the first signal and the second signal.

2. The apparatus of claim 1, wherein the first acoustic detector and the second acoustic detector further comprise:
    a plurality of sensors disposed circumferentially about the BHA.

3. The apparatus of claim 2, wherein the at least one processor is further configured to perform the steps of:

combining outputs of each of a plurality of sensors of the first acoustic detector to provide a first multipole mode of order m, m≥0;
combining outputs of each of a plurality of sensors of the second acoustic detector to produce a second multipole signal of order m; and
stacking the first multipole signal and the second multipole signal to estimate a shear velocity of the earth formation.

4. The apparatus of claim 3 wherein when m is equal to zero, the estimated formation velocity is an estimated compressional or Stoneley wave velocity and when m>1, the estimated formation velocity is the formation shear velocity.

5. The apparatus of claim 4, wherein the at least one processor is further configured to perform the steps of:
coherency-stacking outputs of the plurality of sensors to provide a plurality of coherency-stacked azimuthal signals, wherein each of the plurality of sensors has an azimuth identical to an azimuth of one of: the first acoustic detector and the second acoustic detector;
combining the plurality of coherency-stacked azimuthal signals to produce a stacked signal of order m; and
estimating the formation velocity using the stacked multipole signal.

6. The apparatus of claim 1, wherein at least one of the first detector and the second detector further comprises a plurality of detector elements that include at least one of: (i) a piezoelectric material, (ii) an electrostrictive material, and (iii) a magnetostrictive material.

7. The apparatus of claim 1 wherein the apparatus is configured to operate in a formation wherein the shear velocity of the formation is greater than a compressional wave velocity of a fluid in the borehole and the multipole signals further comprise a first mode and a second mode, and wherein the at least one processor is configured to estimate the shear velocity of the formation using the second mode.

8. The apparatus of claim 1 wherein the BHA is conveyed in the borehole with the drillbit centered in the borehole.

9. The apparatus of claim 1 wherein the at least one processor is further configured to filter the first signal and the second signal to attenuate a tool mode signal.

10. A method for evaluating an earth formation, comprising:
conveying a drillbit into a borehole on a bottomhole assembly (BHA) having a drill collar and using the drillbit for producing a propagating acoustic signal including multipole components in the earth formation;
rotating the drillbit at a frequency in a predetermined frequency band to generate multipole components propagating through the earth formation substantially free of multipole components propagating through the drill collar;
using a first acoustic detector on the BHA for producing a first signal indicative of the multipole components in the propagating acoustic signal;
using a second acoustic detector axially spaced apart from the first acoustic detector for producing a second signal indicative of the multipole components; and
estimating a formation velocity of an acoustic signal based on the first signal and the second signal.

11. The method of claim 10, further comprising:
filtering the first signal and the second signal to attenuate a tool mode signal.

12. The method of claim 10, further comprising:
using, for the first acoustic detector and the second acoustic detector, a quadrupole detector.

13. The method of claim 10, further comprising:
using, for the first acoustic detector and the second acoustic detector, a plurality of sensors disposed circumferentially around the BHA.

14. The method of claim 10, further comprising:
conveying the BHA in a borehole in a formation where the shear velocity of the formation is greater than a compressional wave velocity of a fluid in the borehole and the multipole signals further comprise a first mode and a second mode, the method further comprising estimating the shear velocity of the formation using the second mode.

15. The method of claim 14, wherein estimating the shear velocity of the formation further comprises the steps of:
combining outputs of each of the plurality of sensors of the first acoustic detector to provide a first multipole signal of order m, m≥0;
combining outputs of each of the outputs of the plurality of sensors of the second acoustic detector to produce a second multipole signal of order m; and
stacking the multipole components of the first signal and the monopole components of the second signal to estimate the shear velocity of the earth formation.

16. The method of claim 15, wherein estimating the velocity of the formation further comprises the steps of:
coherency-stacking outputs of the plurality of sensors to provide a plurality of coherency-stacked azimuthal signals, wherein each of the plurality of sensors has an azimuth identical to an azimuth of one of: the first acoustic detector and the second acoustic detector;
combining the plurality of coherency-stacked azimuthal signals to produce a stacked multipole signal of order m; and
estimating the formation shear velocity using the stacked multipole signal.

17. A non-transitory computer-readable medium product having stored thereon instructions that, when executed by at least one processor, perform a method, the method comprising:
conveying a drillbit into a borehole on a bottomhole assembly (BHA) having a drill collar and using the drillbit for producing a propagating acoustic signal including multipole components in the earth formation;
rotating the drillbit at a frequency in a predetermined frequency band to generate multipole components propagating through the earth formation substantially free of multipole components propagating through the drill collar;
using a first acoustic detector on the BHA for producing a first signal indicative of the multipole components in the propagating acoustic signal;
using a second acoustic detector axially spaced apart from the first acoustic detector for producing a second signal indicative of the multipole components; and
estimating a formation velocity of an acoustic signal based on the first signal and the second signal.

18. The non-transitory computer-readable medium product of claim 17 further comprising at least one of: (i) a ROM, (ii) an EPROM, (iii) an EEPROM, (iv) a flash memory, and (v) an optical disk.

* * * * *